United States Patent [19]
Tabata et al.

[11] Patent Number: 5,131,273
[45] Date of Patent: Jul. 21, 1992

[54] ANGULAR VELOCITY SENSOR AND A SENSOR APPARATUS INCORPORATING THE SAME

[75] Inventors: Munehiro Tabata; Suzushi Kimura; Tadashi Kawamata; Tsunenori Yoshida, all of Osaka; Tomio Yoshida, Yokohama, all of Japan

[73] Assignee: Matsushita Electric Industrial Co., Ltd., Osaka, Japan

[21] Appl. No.: 548,705

[22] Filed: Jul. 6, 1990

[30] Foreign Application Priority Data

Jul. 7, 1989 [JP] Japan .................................. 1-175796
Feb. 26, 1990 [JP] Japan .................................. 2-44874

[51] Int. Cl.$^5$ .............................................. G01P 9/04
[52] U.S. Cl. ......................................... 73/505; 73/497
[58] Field of Search ................ 73/505, 497, 431, 510

[56] References Cited

U.S. PATENT DOCUMENTS

| | | | |
|---|---|---|---|
| 4,520,669 | 6/1985 | Rider | 73/510 |
| 4,628,734 | 12/1986 | Watson | 73/505 |
| 4,671,112 | 6/1987 | Kimura et al. | 73/505 |
| 4,791,815 | 12/1988 | Yamaguchi et al. | 73/505 |

FOREIGN PATENT DOCUMENTS 60-216210 10/1985 Japan .
64-29705 1/1989 Japan .

OTHER PUBLICATIONS

"Journal of the Japan Society For Aerological and Space Sciences" vol. 23, No. 257, pp. 339-350 (Jun. 1975).

Primary Examiner—John E. Chapman
Attorney, Agent, or Firm—Lowe, Price, LeBlanc & Becker

[57] ABSTRACT

An angular velocity sensor includes a pair of vibratory piezoelectric detecting elements defining detecting planes which are disposed in symmetry about a plane containing the sense axis and out of right-angled orientation with respect to this plane. The detecting elements thus arranged assume a widely spread or flattened V-shaped configuration as viewed from above. Output signals of opposite polarities received from the respective detecting elements are weighted respectively and added together so as to cancel out unwanted leak component signals. Thus, leak component signals resulting from assembling tolerances can be canceled. In this instance, if the characteristics of two sensor elements each including one of the detecting elements are fully equivalent, a leak component signal dependent on a disturbing inertial force can simultaneously be canceled out. With this construction, the variation of the offset voltage can be reduced even when the sensor is subjected to a great change in environmental conditions including temperature.

12 Claims, 6 Drawing Sheets

ANGULAR VELOCITY SENSOR AND A SENSOR APPARATUS INCORPORATING THE SAME

BACKGROUND OF THE INVENTION

The present invention relates to gyroscopes, and more particularly to an angular velocity sensor using piezoelectric oscillating elements, and a sensor apparatus incorporating such sensor.

Conventionally, inertial navigation systems incorporating gyroscopes have been used to determine the bearing of a moving object such as an airplane or a ship. The gyroscopes include a sensor composed mainly of a spinning gyro of the mechanical type or a laser gyro using a laser apparatus. The mechanical or optical gyro is solely satisfactory in insuring a stable direction detection, however, it requires a relatively large and expensive structure and cannot, therefore, be applied to consumer equipment which should be small in size and of relatively low cost.

Another known angular velocity sensor is of the vibratory or oscillating type, which includes a sensor element co-oscillatable with an oscillating object or structure to which the sensor element is secured, for detecting the so-called Coriolis force. Most vibrational angular velocity sensors have either a piezoelectric mechanism or an electromagnetic mechanism. These sensors are characterized by the motion of a mass constituting a gyro which is a vibratory or oscillating motion rather than a rotary motion of a constant angular velocity. When an oscillating mass is subjected to an angular velocity $\Omega$, there is produced a force, known as the Coriolis force, in the form of a vibratory torque which is equivalent to the number of vibrations of the oscillating mass. One problem associated with such vibrational sensor is a high sensitivity to disturbing inertial forces.

When the sensor is subjected to a disturbing inertial force, a sensing signal produced by an oscillating sensor element involves a component dependent upon the Coriolis force and a component dependent upon the disturbing inertial force, which should be separated from one another. Since the Coriolis force is proportional to the vector product of an input inertial angular velocity and a driving velocity, this Coriolis force acts in a direction perpendicular to the direction of the instantaneous driving velocity and the direction of the input inertial angular velocity. If two such oscillating sensor elements are paired to oscillate in directions opposite to one another about a nodal axis of symmetry, disturbing inertial forces acting in a same direction can be canceled out by adding to a difference between two sensing electric signals, obtained by mechanical-to-electric conversion from forces acting on the respective oscillating sensor elements, a component corresponding to the Coriolis force acting in the opposite direction. Vibrational sensing of a torque caused by the Coriolis force provides a measurement of an angular velocity. This is the principle of operation of the vibratory angular velocity sensors stated above. Most vibratory angular velocity sensors devised heretofore utilize piezoelectric members as described for example in Journal of the Japan Society for Aerological and Space Sciences, Vol. 23, No. 257, pp. 339-350.

Japanese Patent Laid-open Publication No. 60-216210 in the name of the present assignee discloses an angular velocity sensor operative based on the principle described above. Generally speaking, a gyroscope relying on sensing of the Coriolis force in achieving a measurement of an angular velocity is a sensor which is ideally realized only when the assembling accuracy is theoretically within a zero tolerance zone. To this end, a vibratory angular velocity sensor using a pair of piezoelectric oscillating elements requires an extremely high precision assembly of the respective piezoelectric oscillating elements and various structural component parts to be assembled. It is however nearly impossible to assemble various component parts in an errorfree condition in terms of the parallelism, the perpendicularity and the degree of symmetry. As a result, a leak component signal is generated due to assembling tolerances. An inertial force (driving inertial force) acting as a reaction to an acceleration caused by driving or oscillation produces an unnecessary leak component signal in a direction perpendicular to a sense plane of the piezoelectric sensor elements.

Furthermore, in the vibratory angular velocity sensors, a sensing signal corresponding to the disturbing inertial force includes a leak component signal due to generation of an acceleration component caused by oscillation in a direction perpendicular to the sense axis. When the vibratory angular velocity sensor is used in a navigation system, the leak component signal appears as measurement errors which will significantly deteriorate the performance of the navigation system.

The leak component signal also varies with environmental conditions such as the temperature, time, etc. Accordingly, if a leak component signal resulting from assembling tolerances varies with a change in environmental conditions, the resulting leak component signal is detected and outputted from the sensor. The detected leak component signal causes a drift in the offset voltage. Furthermore, as widely known, the piezoelectric oscillating elements are pyroelectric and hence they produce an extremely large voltage when a temperature change takes place.

SUMMARY OF THE INVENTION

With the foregoing difficulties in view, it is an object of the present invention to provide an angular velocity sensor and a sensor apparatus incorporating the same which can cancel out not only a leak component signal caused by assembling tolerances but also a leak component signal caused by a distrubing inertial force, and has reduced zero point drifts even when subjected to a change in environmental conditions including the temperature.

According to a first aspect of the present invention, there is provided an angular velocity sensor which comprises: a pair of sensor elements each including a vibratory piezoelectric detecting element and a vibratory piezoelectric drive element joined together in longitudinal alignment and oriented at an angle of 90 degrees relative to each other; a joining member joining respective free ends of the drive elements so as to form, jointly with the sensor elements, a tuning-fork structure, the tuning-fork structure having a sense axis; and the detecting elements having respective detecting planes which are symmetric about a first plane containing the sense axis of the tuning-fork structure and disposed out of alignment with a second plane extending perpendicular to the first plane.

According to a second aspect of the invention, there is provided an angular velocity sensor which comprises: a pair of sensor elements each including a vibratory piezoelectric detecting element and a vibratory piezoelectric drive element joined together in longitudinal alignment and disposed out of right-angled orientation with each other; a joining member joining respective free ends of the drive elements so as to form, jointly with the sensor elements, a tuning-fork structure, the tuning-fork structure having a sense axis; and the drive elements having respective vibrating planes extending parallel to a plane containing the sense axis of the tuning-fork structure.

A third aspect of the invention provides an angular velocity sensor apparatus which comprises, in combination with each of the angular velocity sensors described above, a circuit means for detecting output signals from the detecting elements and processing the detected output signals to produce an output signal which is adjusted to be zero when an angular velocity component of the detected output signals is zero, thereby adjusting leak component signals representing drift components.

Since the detecting planes of the respective detecting elements are disposed in symmetry with each other about a first plane containing the sense axis and out of alignment with a second plane extending perpendicular to the first plane, output voltages from the respective detecting elements have opposite polarities. Consequently, by adding the output voltages with appropriate weighting, unwanted leak component signals which could be produced depending on assembling tolerances are canceled out or otherwise removed from an output signal. In this instance, if the properties of two sensor elements are equivalent to each other, leak component signals dependent upon disturbing inertial forces can simultaneously be canceled out. Thus, a component dependent upon the Coriolis forces and components dependent upon disturbing inertial forces are separated from one another at high accuracy by using a circuit means.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE PREFERRED EMBODIMENT

Figure 1:
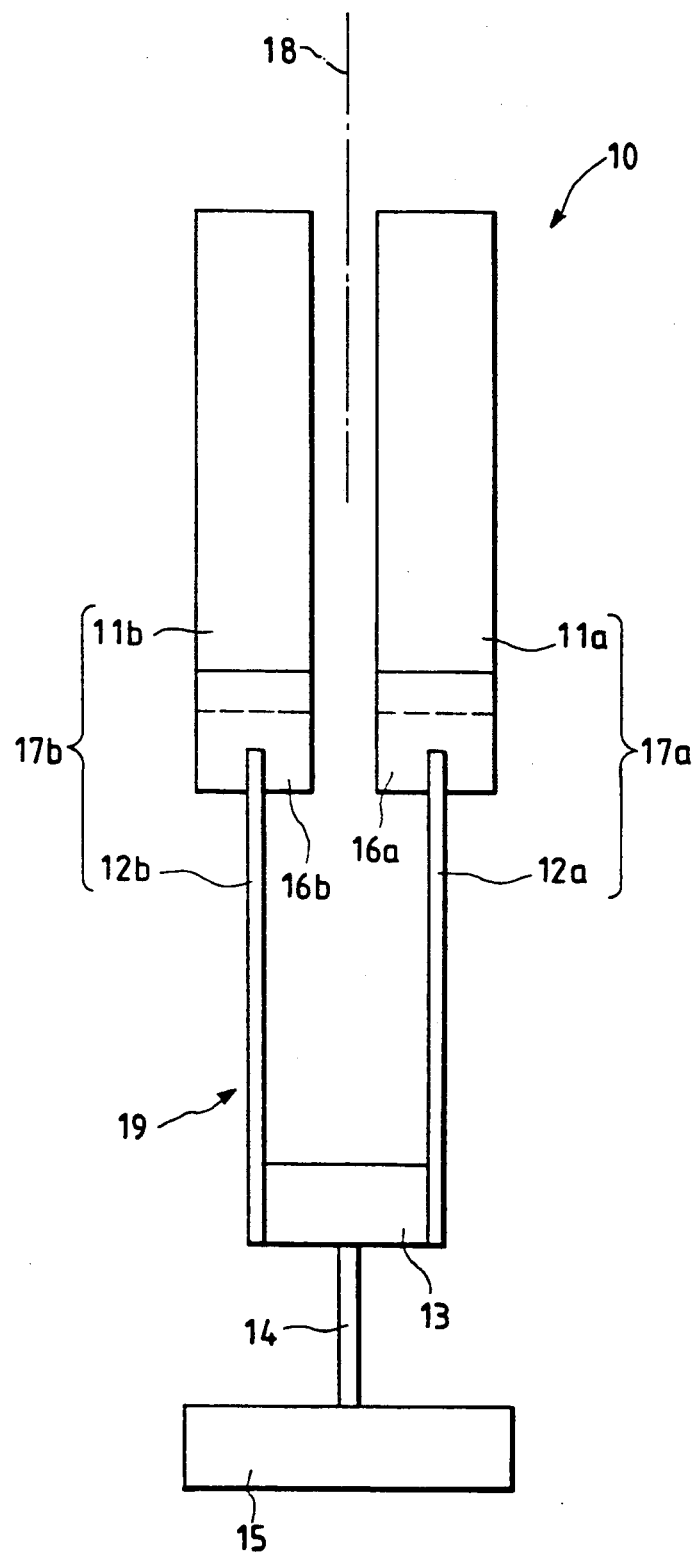
FIG. 1 is a front elevational view of an angular velocity sensor according to an embodiment of the present invention.

FIG. 1 diagrammatically illustrates an angular velocity sensor 10 according to an embodiment of the present invention. The angular velocity sensor 10 generally comprises first and second vibratory piezoelectric detecting elements 11a, 11b, first and second vibratory piezoelectric drive elements 12a, 12b, an electrode block 13, a support rod 14, a base 15 and first and second joint members 16a, 16b.

The vibratory piezoelectric detecting elements 11a, 11b and the vibratory piezoelectric drive elements 12a, 12b are formed from relatively thin elongate rectangular plates, respectively. The first detecting element 11a and the first drive element 12a are longitudinally aligned end to end and joined together by the joint member 16a with the corresponding planes of detecting element 11a and drive element 12a oriented at an angle of 90 degrees relatively to each other. The first detecting element 11a and the first drive element 12a thus joined constitute a first sensor element 17a. Similarly, the second detecting element 11b and the second drive element 12b are longitudinally aligned end to end and joined together by the joint member 16b with the corresponding planes of detecting element 12a and drive element 12b oriented at an angle of 90 degrees relative to each other. The second detecting element 11b and the second drive element 12b thus joined constitute a second sensor element 17b. The first and second sensor element 17a, 17b are disposed parallel to each other and in symmetry with each other about a nodal axis 18 of symmetry (hereinafter referred to as "sense axis") and joined by soldering at their free ends to the electrode block 13 so as to jointly constitute a tuning-fork structure 19. The vibratory piezoelectric elements 11a, 11b, 12a, 12b may be a unimorphous element or alternatively a bimorphous element. The electrode block 13 of the tuning-fork structure 19 is supported by the support rod 14 which is connected at its lower end to the base 15.

Figure 2:
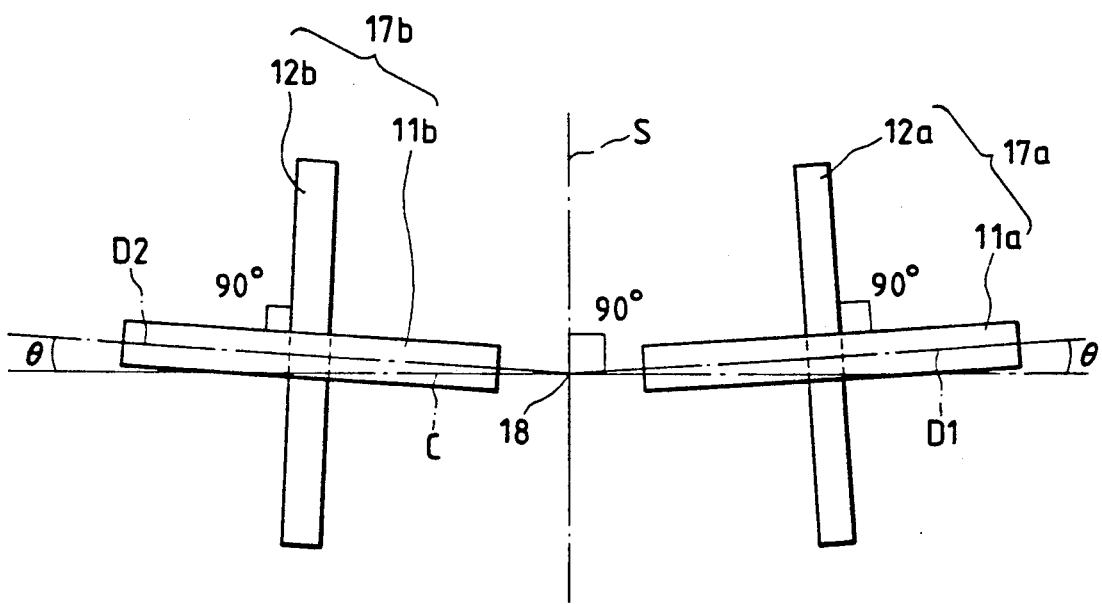
FIG. 2 is a top plan view of the angular velocity sensor.

The detecting elements 11a, 11b and the corresponding drive elements 12a, 12b joined in longitudinal alignment along the sense axis 18 but turned 90° are arranged such that detecting planes D1, D2 (FIG. 2) of the respective detecting elements 11a, 11b are symmetric with each other about a plane S containing the sense axis 18 and disposed out of alignment with a common plane C extending perpendicular to the plane S, as shown in FIG. 2. The degree of misalignment or inclination between the detecting planes D1, D2 and the common plane C is determined depending upon the assembling accuracy, which is determined when the detecting elements 11a, 11b and the mating drive elements 12a, 12b are assembled in the right-angled orientation stated above. However, it is important that the first and second detecting elements 11a, 11b of the tuning-fork structure 19 are disposed to assume a widely spread or otherwise flattened V-shaped configuration and jointly define therebetween an obtuse angle which is closer to 180 degrees than to 90 degrees. In the illustrated embodiment, the perpendicularity between the detecting elements 11a, 11b and the driving elements 12a, 12b is with the tolerance zone of an angle of 20 seconds and the respective detecting planes D1, D2 of the detecting elements 11a, 11b are inclined at an angle $\theta$ of 1 degree relative to the common plane C perpendicular to the plane S containing the sense axis 18.

In the illustrated embodiment, to assemble the detecting elements 11a, 11b in such angled condition, opposite bonding surfaces of the electrode block 13 to which the drive elements are soldered are not parallel to each other but provide a V-shaped configuration diverging at an angle of 2 degrees. As a consequence, oscillating planes of the respective drive elements are arranged in a V-shaped configuration and define therebetween an angle of 2 degrees.

The principle of operation of the piezoelectric angular velocity sensor 10 will be described later. To oscillate the drive elements 12a, 12b, an alternating drive signal is applied between the outer surfaces of the respective drive elements 12a, 12b with their inside surfaces electrically connected together to form a common electrode. The drive elements 12a, 12b thus excited are caused to oscillate at the same frequency and opposite phase (i.e., a phase difference of 180 degrees) in a manner generally known as the tuning-fork oscillation. In general, the characteristics of a vibratory piezoelectric element having a cantilever construction are determined by the piezoelectric constant of the piezoelectric element and the size and shape of the material. However, the characteristics of an angular velocity sensor using two piezoelectric drive elements are determined by the overall performance of the piezoelectric detecting elements 11a, 11b, the piezoelectric drive elements 12a, 12b, the electrode block 13 serving as a joint member, and the influence of an adhesive used for bonding the detecting element 11a, 11b and the drive element 12a, 12b. In the illustrated embodiment, the tuning-fork structure 19 is designed to oscillate at a resonant frequency of 1000-1100 Hz, with an amplitude of oscillation of about 25 $\mu$m at the free ends of the detecting elements 11a, 11b. In order to pick up the amount of electric charges which is equivalent to mechanical distortions or strains caused by forces known as the Coriolis forces acting on the detecting elements 11a, 11b, the detecting elements 11a, 11b are electrically connected by wires (not shown) to electrodes (not shown) provided on the base 15. The rigidity and diameter of the wires should be small enough to allow free oscillation of the sensor elements 17a, 17b at the desired resonant frequency. Electric signals generated as a result of mechanical distortions of the oscillating detecting elements 11a, 11b are proportional to the product of the velocity and an input angular velocity and, therefore, an angular velocity can be detected by the angular velocity sensor 10.

Figure 3:
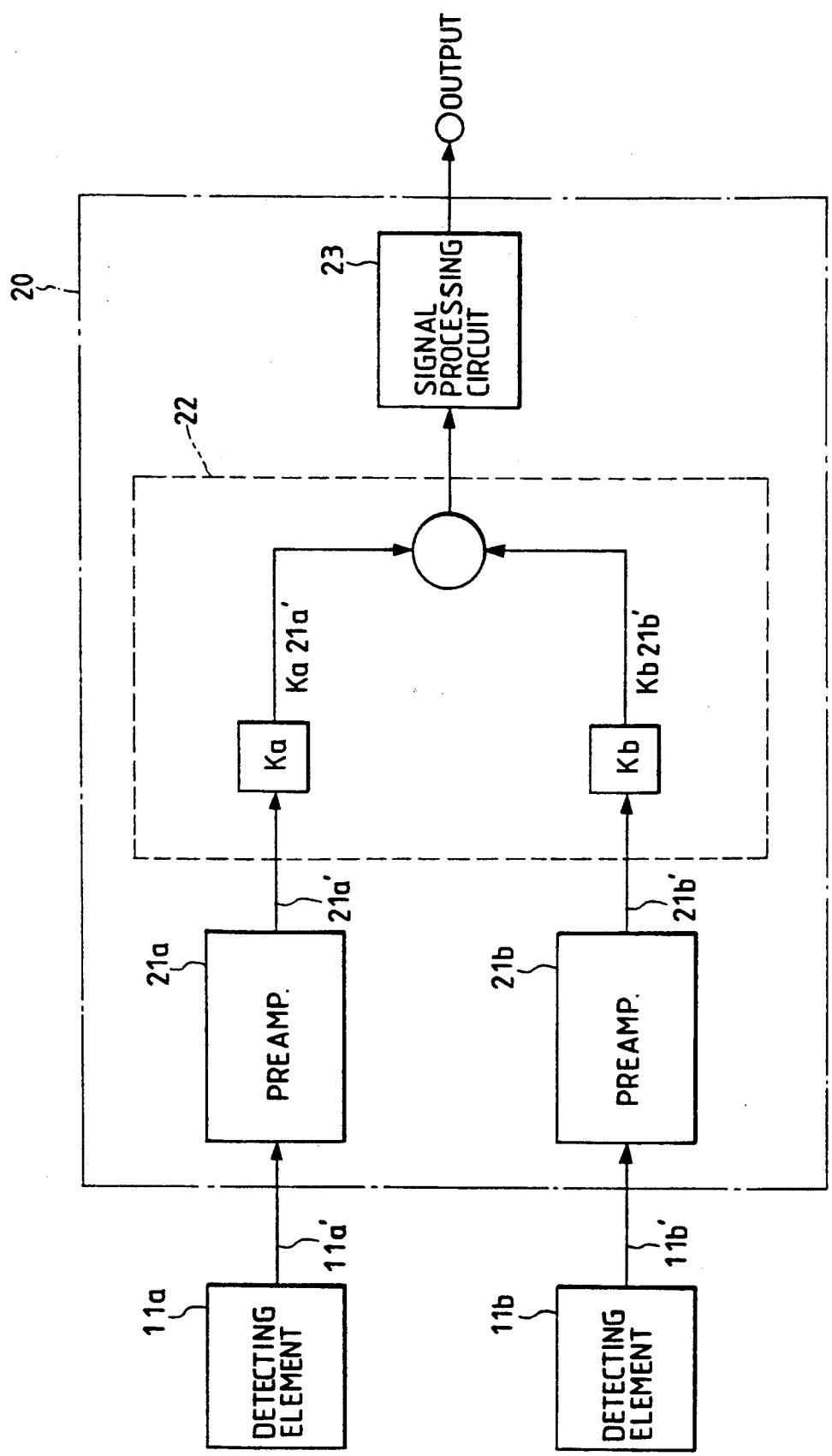
FIG. 3 is a block diagram showing the general construction of an angular velocity detecting circuit associated with the sensor shown in FIG. 1.

The angular velocity sensor 10 of the foregoing construction is electrically coupled to a detecting circuit 20 shown in FIG. 3 and constitutes jointly therewith an angular velocity sensor apparatus.

As shown in FIG. 3, the detecting circuit 20 receives output electric signals (distortion sensing signals) 11a', 11b' from the respective detecting elements 11a, 11b while oscillating. In this instance, depending upon the detecting sensitivity of the detecting element 11a, 11b, each of the distortion sensing signals 11a', 11b' may contain an unwanted leak component signal dependent upon a driving inertial force, a disturbing inertial force and the like, other than a component dependent upon the Coriolis force. The detecting circuit 20 includes two preamplifiers 21a, 21b connected in circuit with the detecting elements 11a, 11b for converting the distortion sensing signals 11a', 11b' into low impedance voltage signals 21a', 21b'. The preamplifiers 21a, 21b are constructed to produce output signals of opposite polarities when the detecting elements 11a, 11b are subjected to forces acting in opposite directions. The preamplifiers 21a, 21b have a substantially the same magnitude of amplification. The preamplifiers 21a, 21b are connected with an adder 22 which is constructed to add the two voltage signals 21a', 21b' after weighting of these voltage signals 21a', 21b' at a ratio which is finely adjustable in a range around 1:1. The adder 22 supplies an output signal to a signal processing circuit 23 which extracts a component dependent upon the Coriolis forces from the received output signal and processes the same to produce an output signal proportional to the input angular velocity. In general, the signal processing circuit 23 is comprised mainly of a synchronous detector. With the detecting circuit 20 thus constructed, noise components of the output signals received from the pair of oscillating piezoelectric detecting elements 11a, 11b, that is, unwanted leak component signals dependent upon the driving inertial force, the disturbing inertial force and the like can be accommodated by a weighting operation achieved by the adder 22. This weighting operation can be performed owing to the flattened V-shaped configuration of the pair of detecting elements 11a, 11b described above. To this end, the detecting elements 11a, 11b are disposed symmetrically along the sense axis 18 in such a manner that the detecting planes D1, D2 (FIG. 2) of the respective detecting elements 11a, 11b incline or tilt at a certain angle $\theta$ from the common plane C perpendicular to the plane S containing the sense axis 18, the angle $\theta$ of inclination being slightly larger than tolerances provided for assembling the detecting elements 11a, 11b and the drive elements 12a, 12b.

As is apparent from the foregoing description, in the angular velocity sensor 10 and the angular velocity sensor apparatus of the foregoing construction, the distortion sensing signals 11a', 11b' from the respective detecting elements 11a, 11b have opposite phases due to the flattened V-shaped configuration of the two detecting elements 11a, 11b. Consequently, by adding these distortion sensing signals 11a', 11b' to cancel out the leak component signals contained therein, an unwanted leak component signal dependent upon the assembling tolerance can perfectly be canceled out or removed. Additionally, if the performance characteristics of the two sensor elements 17a, 17b are fully equivalent to each other, leak component signals dependent upon the disturbing inertial forces can simultaneously be canceled out.

Figure 4:
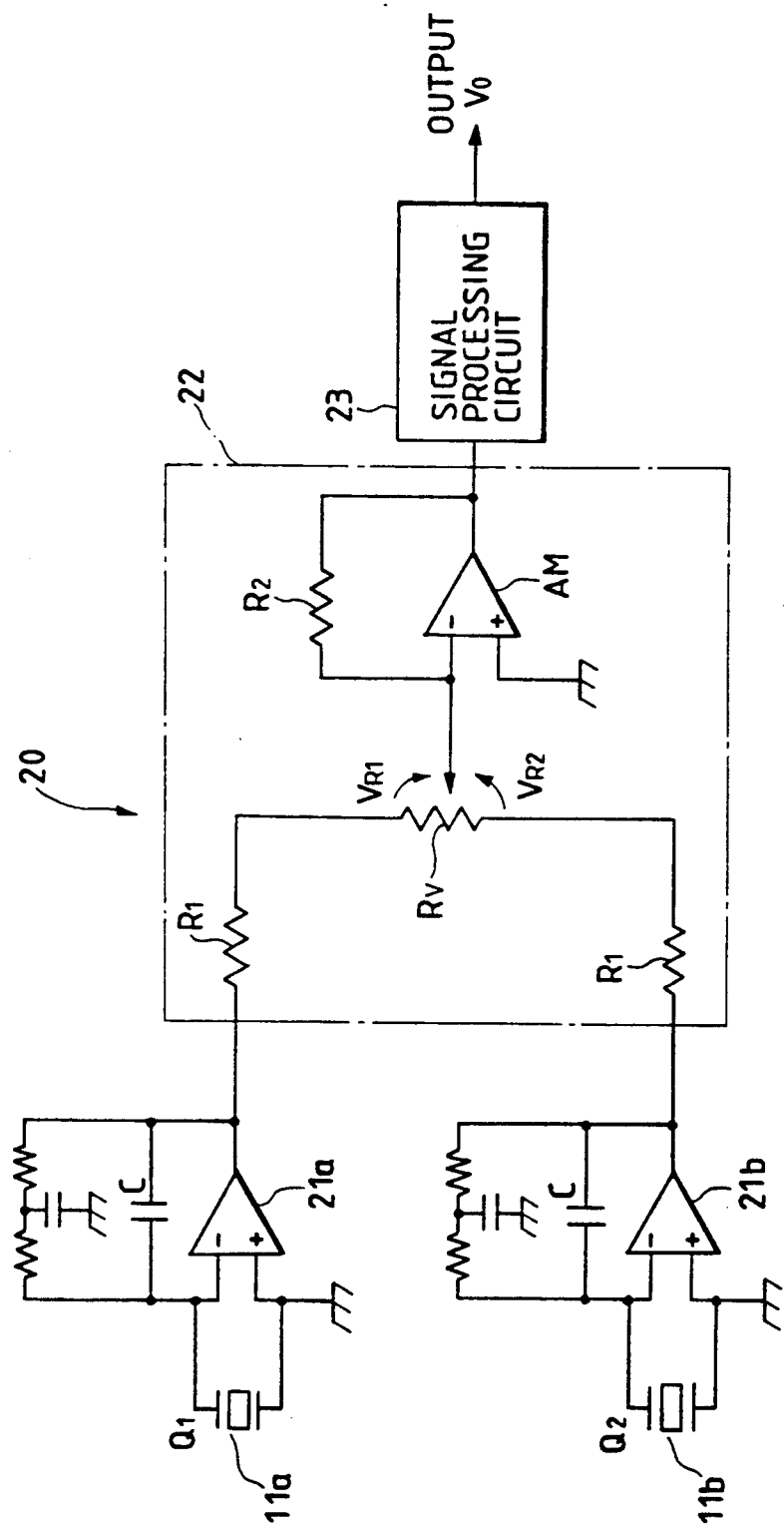
FIG. 4 is a circuit diagram showing details of the angular velocity detecting circuit.

FIG. 4 shows the detailed construction of the detecting circuit 20 shown in FIG. 3. Output signals from the respective preamplifiers 21a, 21b are finely adjusted through a weighting operation achieved by the adder 22. The adder 22 is composed of a pair of first resistors $R_1$, $R_1$, a second resistor $R_2$, a variable resistor $R_V$ and a summing amplifier AM. An output signal from the adder 22 is then converted by the signal processing circuit 23 into a dc voltage $V_O$ which in turn is outputted from the signal processing circuit 23. In this instance, if the distortion sensing signals 11a', 11b' were merely added by the detecting circuit 20, the output dc voltage $V_O$ would contain a leak component signal voltage. For purposes of confirmation, a comparison is made between a first adding operation of output signals 11a', 11b' received from the respective detecting elements 11a, 11b which is achieved without a weighting operation for canceling leak component signals, and a second adding operation of these output signals 11a', 11b' which is achieved with the weighting operation.

An output do voltage obtained by the first adding operation contains a leak voltage of 2.2 V. In the second adding operation, the output signals 11a', 11b' to be added are weighted by adding respectively thereto resistances $V_{R1}$ and $V_{R2}$ at a ratio of 19:23 with the result that no leak voltage is contained in the output dc voltage. A measurement is made to determine a variation of leak voltage and a variation of offset voltage when the environmental temperature rises from 25° C. to 75° C. The results obtained are shown in Table 1.

TABLE 1

|  | Variation of leak voltage | Variation of offset voltage |
|---|---|---|
| Not canceled | 700 mV | 620 mV |
| Canceled | 10 mV | 12 mV |

As is apparent from Table 1, even in the event of a large temperature change, the variation of leak voltage obtained after cancellation of the leak components is considerably smaller than that obtained without cancellation of the leak components. This means that even when leak component signals of the respective sensor elements 17a, 17b vary with the temperature, such temperature-dependent changes are canceled with each other. Consequently, since the temperature-dependent change of leak voltage is thus reduced, the variation of offset voltage can be minimized even with the presence of an error in synchronous detection.

Figure 5:
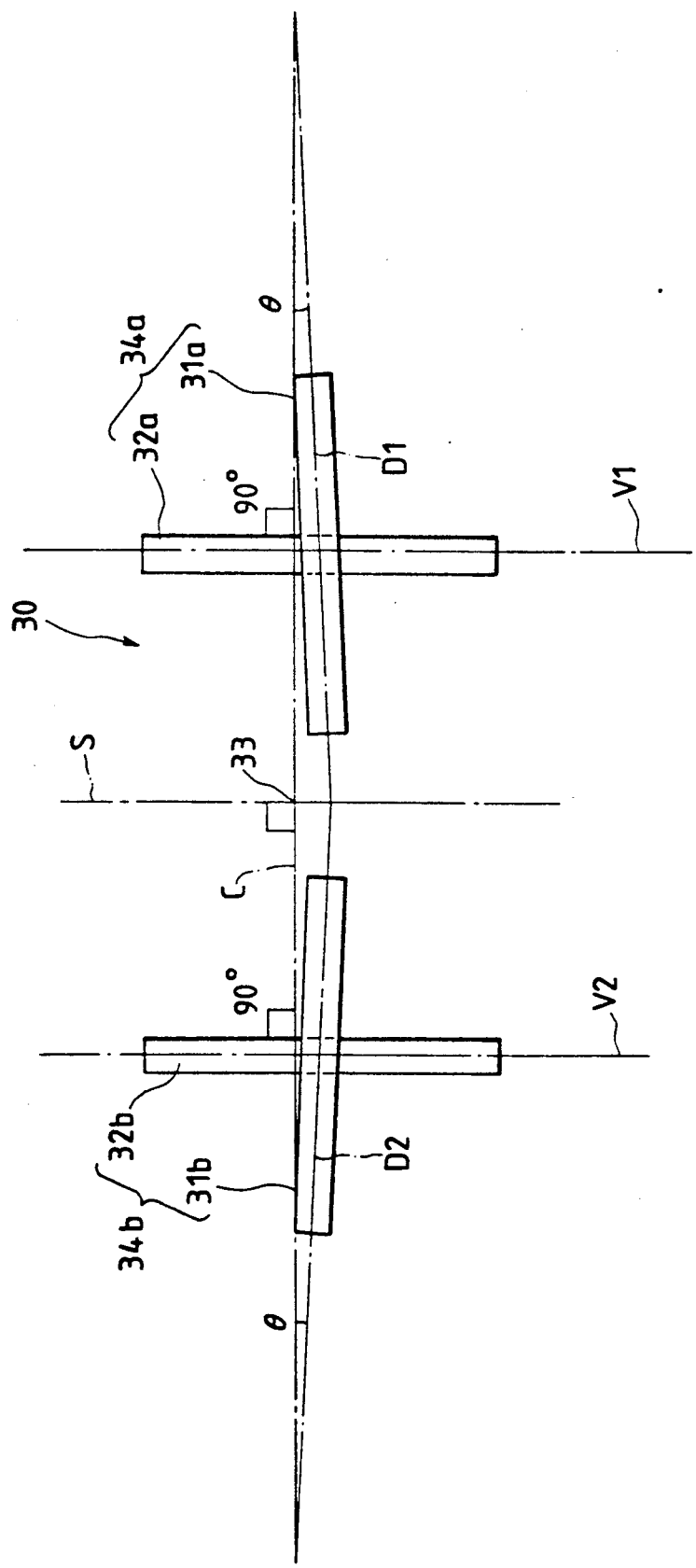
FIG. 5 is a top plan view of an angular velocity sensor according to another embodiment.

FIG. 5 shows an angular velocity sensor 30 according to a second embodiment of the present invention. The principle of operation of the angular velocity sensor 30 is the same as that of the angular velocity sensor 10 according to the embodiment described above with reference to FIGS. 1 and 2. The angular velocity sensor 30 includes first and second vibratory piezoelectric detecting elements 31a, 31b and first and second vibratory piezoelectric drive elements 32a, 32b which are joined respectively with the first and second detecting elements 31a, 31b in longitudinal alignment along a sense axis 33 but slightly offset from an orthogonal or right-angled orientation (i.e., the detecting elements and the drive elements are turned at an angle other than 90 degrees). The detecting and drive elements 31a, 32a and 31b, 32b thus joined form two sensor elements 34a, 34b. The free ends of the drive elements 32a, 32b are connected together by an electrode block (not shown) so that the sensor elements 34a, 34b and the electrode block jointly constitute tuning fork structure. Unlike the electrode block 13 shown in FIG. 1, the electrode block of this embodiment has opposite surfaces extending parallel to one another, so that the first and second drive elements 32a, 32b have their respective vibrating planes V1, V2 extending parallel to a plane S containing the sense axis 33.

With this arrangement, the detecting elements 31a, 31b have detecting planes D1, D2 extending to assume a widely spread or otherwise flattened V-shaped configuration. In the illustrated embodiment, the tolerable accuracy in assembling the detecting elements 31a, 31b and the drive elements 32a, 32b is an angle of 20 seconds, so the detecting elements 31a, 31b and the drive elements 32a, 32b are joined such that the detecting planes D1, D2 of the respective detecting elements 31a, 31b are symmetric with each other about the plane S containing the sense axis 33 and tilt or incline from a common plane perpendicular to the plane S at an angle $\theta$ slightly larger than the tolerable assembling accuracy. The angle $\theta$ may be 1 degree, for example.

In addition to the flattened V-shaped configuration of the vibratory piezoelectric detecting elements 31a, 31b, the angular velocity sensor 30 is coupled with a detecting circuit (not shown but identical to the detecting circuit 20 of the first embodiment shown in FIG. 3). To deal with leak component signals which could appear due to a deviation from the symmetric arrangement caused by assembling tolerances, the detecting circuit is provided with an adder which performs a weighted summing or addition of an output signal from the first detecting element 31a and an output signal from the second detecting element 31b. This arrangement makes it possible to achieve a highly accurate separation of a component dependent upon the Coriolis forces and a component dependent upon a driving inertial force without restricting the matching property. The angular velocity sensor 30 and an angular velocity sensor apparatus incorporating the sensor 30 and the detecting circuit described above are therefore highly accurate and least sensitive to the driving inertial force.

In general, the angular velocity sensor apparatus includes a sensor unit composed of a vibratory piezoelectric angular velocity sensor received in a container or housing either alone, or in combination with a driving and detecting circuit. According to one known proposal, the housing is received in a constant temperature chamber. According to another known proposal, the housing is evacuated as disclosed in Japanese Patent Laid-open Publication No. 64-29705.

In the angular velocity sensor apparatus, a driving acceleration component is produced as a disturbing inertial force which will result in the generation of a leak component signal. To separate the leak component signal and the component dependent upon the Coriolis forces, a synchronous detection is carried out as a signal processing operation. A problem associated with such signal processing operation is that the magnitude of leak component signals varies with a thermal change in the piezoelectric constant of the piezoelectric elements, and the offset voltage (an output voltage appearing in the absence of angular velocity input) varies with a change of environmental temperature.

Assuming that the offset voltage appearing at the start of an automobile is $V_{off}$ and an output from a vibratory angular velocity sensor apparatus at a certain point of time is $V_w$, an output component dependent on an angular velocity input is calculated by $V_{off} - V_w$. However, when the offset voltage $V_{off}$ changes, such change is not distinctive from the output component dependent upon the angular velocity input. The variation of the offset voltage accumulates and results in an angle error.

With this difficulty in view, it may be considered that the angle error is corrected by again inputting the offset voltage when the automobile stops. This practice is not satisfactory because a cumulative angle error is produced when the sensor apparatus is subjected to a great temperature change before the stop of the automobile.

In order to reduce the influence of the temperature, the vibratory angular velocity sensor apparatus may be received in a constant temperature chamber. In this instance, however, it takes a relatively long time to provide a constant temperature condition, and hence the sensor apparatus needs a long warm-up time. By the use of a vacuum container, a change in temperature of the sensor may be slowed down relative to changes of the environmental temperature. However, a high vacuum state in the container is difficult to maintain over a prolonged period of time. Since the degree of vacuum in the vacuum container is gradually deteriorated, a desired slowing down of the sensor temperature is difficult to obtain.

With the foregoing difficulties in view, the present invention is particularly suitable when embodied in an angular velocity sensor apparatus which is able to reduce a cumulative angle error even when the environmental temperature changes and produces an output signal without being affected by a change of the environmental temperature.

Figure 6:
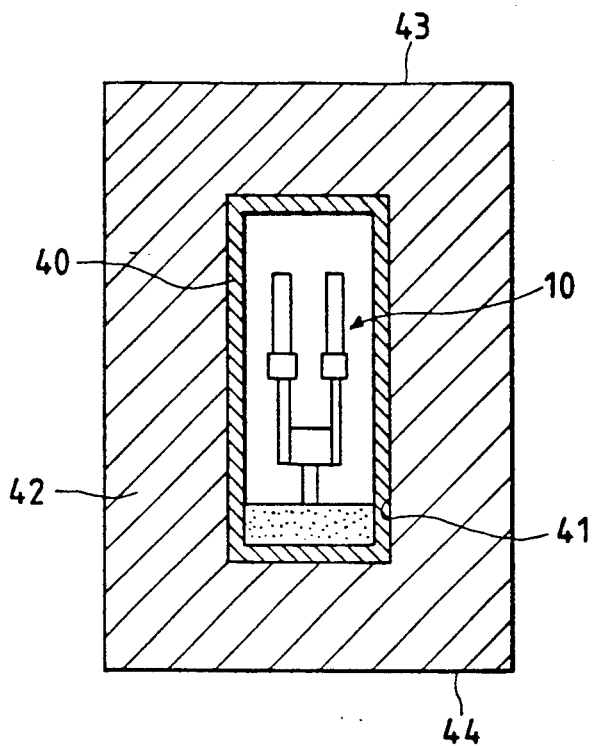
FIG. 6 is a schematic cross-sectional view of an angular velocity sensor apparatus according to an embodiment of the invention.

As shown in FIG. 6, an angular velocity sensor 10 (identical to the angular velocity sensor 10 shown in FIG. 1) is received in a cylindrical housing or case 40 of brass. The cylindrical housing 40 has an outside diameter of 8 mm and is press-fitted in a central hole 41 of 7.9 mm in diameter formed in a heat insulating member 42 of cork. With the heat insulating member 42 thus provided, the thermal conduction between the outside air and the encased sensor 10 does not take place even when the heat insulated sensor 10 is subjected to a rapid change of the environmental temperature. Thus, a change in temperature of the angular velocity sensor 10 is minimized. Furthermore, the heat insulating member 42 made of cork is thermally stable and hence provides a sufficient heat insulating effect over a prolonged period of time. The cork heat insulating member 42 firmly embracing the press-fitted housing 40 has an excellent shock absorbing property and hence unwanted oscillation of the housing 40 caused by the oscillating supporting rod 14 is substantially absorbed by the heat insulating member 42. It is preferable that the top surface 43 or the bottom surface 44 of the heat insulating member 42 extends perpendicularly to the sense axis 18 (FIG. 1). With this arrangement, the positioning of the angular velocity sensor 10 relative to an object to which the sensor 10 is secured can be achieved accurately with utmost ease by merely setting the top surface 43 or the bottom surface 44 on a reference mounting surface of the object.

Figure 7:
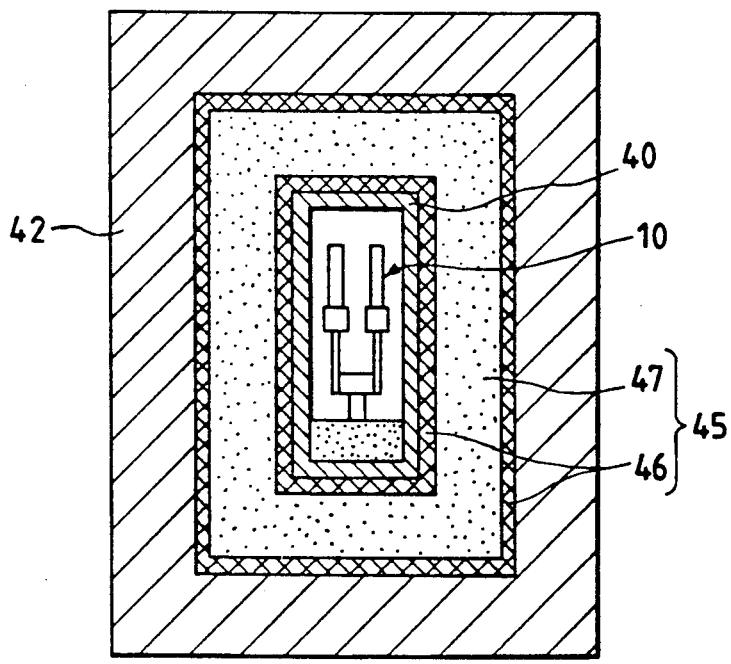
FIG. 7 is a view similar to FIG. 6 but showing an angular velocity sensor apparatus according to another embodiment.

FIG. 7 shows a modified angular velocity sensor apparatus according to the invention. In FIG. 7, these parts which correspond to those shown in FIG. 6 are designated by corresponding reference characters and hence a description is no longer necessary. The angular velocity sensor apparatus includes an angular velocity sensor 10 received in a cylindrical brass case or housing 40. The housing 40 is completely surrounded by a heat storage layer 45 which is comprised of a plastic container 46 holding therein a heat storage material 47 including a polyacryl acid derivative and water as essential ingredients. The heat storage layer 45 is completely surrounded by a layer of heat insulating member 42 of cork.

The thermal conduction caused by changes of the environmental temperature between the outside and the inside of the sensor apparatus is prevented by the heat insulating member 42 having a low heat transfer coefficient. Additionally, the heat transmitted inwardly through the heat insulating member 42 is stored by the heat storage layer 45 having a large thermal capacity. This combination of the thermal insulating member 42 and the heat storage layer 45 makes it possible to reduce a change in temperature of the angular velocity sensor 10.

The environmental heat may be transmitted by radiation to the angular velocity sensor 10. It is therefore possible to cover the outside surface of the heat insulating member 42 with a film (not shown) of metal such as aluminum, stainless steel, etc., to prevent thermal conduction by radiation.

In the embodiments shown in FIGS. 6 and 7, the heat insulating member 42 is made of cork. Eligible materials for the insulating member 42 may include polystyrene foam, polyurethane foam, silicone rubber, glass fiber, potassium titanate, etc. These materials may be used in combination to form a multilayered or composite heat insulating member, thereby providing a heat insulation strong enough to withstand an operating temperature of the sensor apparatus.

Although the heat storage material 47 used in the embodiment shown in FIG. 7 is of the sensible heat type, it is possible to use a heat storage material of the latent heat type such as $Sr(OH)_2.8H_2O$ and $Ba(OH)_2.8H_2O$, or a heat storage material of the chemical reaction type such as $MgCO_3$ and $BaO_2$.

With the heat insulating material surrounding the housing, a change in temperature of the angular velocity sensor which is caused by a change of the environmental temperature becomes small with the result that the offset voltage changes with a certain time lag after the environmental temperature change. A cumulative angle error can therefore be reduced.

Since the housing is firmly retained in the heat insulating member through a press-fit engagement, and since the heat insulating member has a certain degree of elasticity, unwanted oscillation which may be caused by the oscillating supporting rod is absorbed by the heat insulating member. With the unitary construction of the heat insulating member and the angular velocity sensor, positioning of the sensor apparatus with respect to the sense axis of the angular velocity sensor can be achieved accurately with utmost ease.

As described above, the detecting planes of the respective vibratory piezoelectric detecting elements are disposed in symmetry about a first plane containing the sense axis and extend at an angle to a second plane perpendicular to the first plane. Output signals of opposite polarities are supplied from the respective detecting elements to a detecting circuit which weights the respective output signals and adds them together to cancel out unwanted leak components. Thus, those leak component signals dependent upon assembling tolerances can perfectly be canceled out or removed.

Obviously various minor changes and modifications of the present invention are possible in the light of the above teaching. It is therefore to be understood that within the scope of the appended claims the invention may be practiced otherwise than as specifically described.

What is claimed is:

1. An angular velocity sensor comprising:
    a pair of sensor elements each including a vibratory piezoelectric detecting element and a vibratory piezoelectric drive element joined together in longitudinal alignment and oriented at an angle of 90 degrees relative to each other;
    a joining member joining respective free ends of said drive elements so as to form, jointly with said sensor elements, a tuning-fork structure, said tuning-fork structure having a sense axis; and
    said detecting elements having planar shapes defining respective detecting planes which are symmetric about a first plane containing said sense axis of said tuning-fork structure and disposed out of alignment with a second plane extending perpendicular to said first plane.

2. An angular velocity sensor comprising:
a pair of sensor elements each including a vibratory piezoelectric detecting element add a vibratory piezoelectric drive element joined together in longitudinal alignment and disposed out of right-angled orientation with each other:
a joining member joining respective free ends of said drive elements so as to form, jointly with said sensor element, a tuning-fork structure, said tuning-fork structure having a sense axis; and
said drive elements having planar shapes defining respective vibrating-element planes extending parallel to a plane containing said sense axis of said tuning-fork structure.

3. An angular velocity sensor apparatus comprises:
an angular velocity sensor including
a pair of sensor elements each composed of a vibratory piezoelectric detecting element and a vibratory piezoelectric drive element joined together in longitudinal alignment and oriented at an angle of 90 degrees relative to each other,
a joining member joining respective free ends of said drive elements so as to form, jointly with said sensor elements, a tuning-fork structure, said tuning-fork structure having a sense axis, and
said detecting elements having planar shapes defining respective detecting planes which are symmetric about a first plane containing said sense axis of said tuning-fork structure and disposed out of alignment with a second plane extending perpendicular to said first plane; and
means for detecting output signals from said detecting elements and processing the detected output signals to produce an output signal which is adjusted to be zero when an angular velocity component of the detected output signals is zero, thereby adjusting leak component signals representing drift components.

4. An angular velocity sensor apparatus comprising:
an angular velocity sensor including
a pair of sensor elements each composed of a vibratory piezoelectric detecting element and a vibratory piezoelectric drive element joined together in longitudinal alignment and disposed out of right-angled orientation with each other,
a joining member joining respective free ends of said drive elements so as to form, jointly with said sensor elements, a tuning-fork structure, said tuning-fork structure having a sense axis, and
said drive elements having planar shapes defining respective vibrating-element planes extending parallel to a plane containing said sense axis of said tuning-fork structure; and
means for detecting output signals from said detecting elements and processing the detected output signals to produce an output signal which is adjusted to be zero when an angular velocity component of the detected output signals is zero, thereby adjusting leak component signals representing drift components.

5. An angular velocity sensor apparatus comprises:
an angular velocity sensor including
a pair of sensor elements each composed of a vibratory piezoelectric detecting element and a vibratory piezoelectric drive element joined together in longitudinal alignment and oriented at an angle of 90 degrees relative to each other,
a joining member joining respective free ends of said drive elements so as to form, jointly with said sensor elements, a tuning-fork structure, said tuning-fork structure having a sense axis, and
said detecting elements having planar shapes defining respective detecting planes which are symmetric about a first plane containing said sense axis of said tuning-fork structure and disposed out of alignment with a second plane extending perpendicular to said first plane;
a pair of preamplifiers for converting output signals from said respective detecting elements into low impedance signals; and
means for weighting the respective low impedance signals and adding them together.

6. An angular velocity sensor apparatus comprising:
an angular velocity sensor including
a pair of sensor elements each composed of a vibratory piezoelectric detecting element and a vibratory piezoelectric drive element joined together in longitudinal alignment and disposed out of right-angled orientation with each other,
a joining member joining respective free ends of said drive elements so as to form, jointly with said sensor elements, a tuning-fork structure, said tuning-fork structure having a sense axis, and
said drive elements having planar shapes defining respective vibrating-element planes extending parallel to a plane containing said sense axis of said tuning-fork structure;
a pair of preamplifiers for converting output signals from said respective detecting elements into low impedance signals; and
means for weighting the respective low impedance signals and adding them together.

7. An angular velocity sensor apparatus comprises:
an angular velocity sensor including
a pair of sensor elements each composed of a vibratory piezoelectric detecting element and a vibratory piezoelectric drive element joined together in longitudinal alignment and oriented at an angle of 90 degrees relative to each other,
a joining member joining respective free ends of said drive elements so as to form, jointly with said sensor elements, a tuning-fork structure, said tuning-fork structure having a sense axis, and
said detecting elements having planar shapes defining respective detecting planes which are symmetric about a first plane containing said sense axis of said tuning-fork structure and disposed out of alignment with a second plane extending perpendicular to said first plane:
a housing for receiving therein said angular velocity sensor, and
a heat insulating member disposed on said housing to fully enclose the same.

8. An angular velocity sensor apparatus according to claim 7 wherein said housing has a cylindrical shape, said heat insulating member having a hole having an inside diameter slightly smaller than the outside diameter of said cylindrical housing, said housing being press-fitted in said hole.

9. An angular velocity sensor apparatus according to claim 7, further including at least one layer of heat storage material disposed between said housing and said heat insulating member.

10. An angular velocity sensor apparatus comprising:
an angular velocity sensor including
- a pair of sensor elements each composed of a vibratory piezoelectric detecting element and a vibratory piezoelectric drive element joined together in longitudinal alignment and disposed out of right-angled orientation with each other,
- a joining member joining respective free ends of said drive elements so as to form, jointly with said sensor elements, a tuning-fork structure, said tuning-fork structure having a sense axis, and
- said drive elements having planar shapes defining respective vibrating-element planes extending parallel to a plane containing said sense axis of said tuning-fork structure;
- a housing for receiving therein said angular velocity sensor; and
- a heat insulating member disposed on said housing to fully enclose the same.

11. An angular velocity sensor apparatus according to claim 10 wherein said housing has a cylindrical shape, said heat insulating member having a hole having an inside diameter slightly smaller than the outside diameter of said cylindrical housing, said housing being press-fitted in said hole.

12. An angular velocity sensor apparatus according to claim 10, further including at least one layer of heat storage material disposed between said housing and said heat insulating member.

* * * * *